(12) United States Patent
Shahoian

(10) Patent No.: US 7,319,374 B2
(45) Date of Patent: Jan. 15, 2008

(54) MOVING MAGNET ACTUATOR

(75) Inventor: Erik J. Shahoian, San Ramon, CA (US)

(73) Assignee: IMMERSION Corporation, San Jose, CA (US)

( * ) Notice: Subject to any disclaimer, the term of this patent is extended or adjusted under 35 U.S.C. 154(b) by 60 days.

(21) Appl. No.: 10/960,104

(22) Filed: Oct. 8, 2004

(65) Prior Publication Data

US 2005/0231313 A1   Oct. 20, 2005

Related U.S. Application Data

(60) Provisional application No. 60/561,917, filed on Apr. 14, 2004.

(51) Int. Cl.
*H01F 7/08* (2006.01)
(52) U.S. Cl. .......................................... 335/220; 310/12
(58) Field of Classification Search ............ 310/12–14; 335/220–234
See application file for complete search history.

(56) References Cited

U.S. PATENT DOCUMENTS

| 4,237,439 | A | * | 12/1980 | Nemoto | 335/230 |
| 4,422,060 | A | * | 12/1983 | Matsumoto et al. | 335/256 |
| 4,594,520 | A | * | 6/1986 | Miwa et al. | 310/12 |
| 4,985,652 | A | | 1/1991 | Oudet et al. | |
| 5,136,194 | A | | 8/1992 | Oudet et al. | |
| 5,434,549 | A | * | 7/1995 | Hirabayashi et al. | 335/229 |
| 5,532,585 | A | | 7/1996 | Oudet et al. | |
| 5,808,381 | A | * | 9/1998 | Aoyama et al. | 310/12 |
| 5,841,250 | A | * | 11/1998 | Korenage et al. | 318/135 |
| 2002/0185919 | A1 | * | 12/2002 | Botos et al. | 310/12 |

OTHER PUBLICATIONS

Carreras, R., "Introducing a Revolutionary Moving Magnet Linear Motor", printed from www.enduratec.com.
Wakiwaka, H. et al., "Influence of Mover Support Structure on Linear Oscillatory Actuator for Cellular Phones", The Third International Symposium on Linear Drives for Industry Applications LDIA 2001, Nagano, Japan, pp. 260-263.

* cited by examiner

*Primary Examiner*—Elvin Enad
*Assistant Examiner*—Bernard Rojas
(74) *Attorney, Agent, or Firm*—Thelen Reid Brown Raysman & Steiner LLP

(57) ABSTRACT

An apparatus includes an electromagnetically conductive assembly including a first member having a first end and a second end and a second member disposed between the first end and the second end of the first member. The second member and the first end of the first member define a first gap. The second member and the second end of the first member define a second gap. A movable member moves with respect to the conductive member. A first magnet is coupled to the movable member and is disposed a distance from the first gap. A second magnet is coupled to the movable member and is disposed a distance from the second gap.

24 Claims, 8 Drawing Sheets

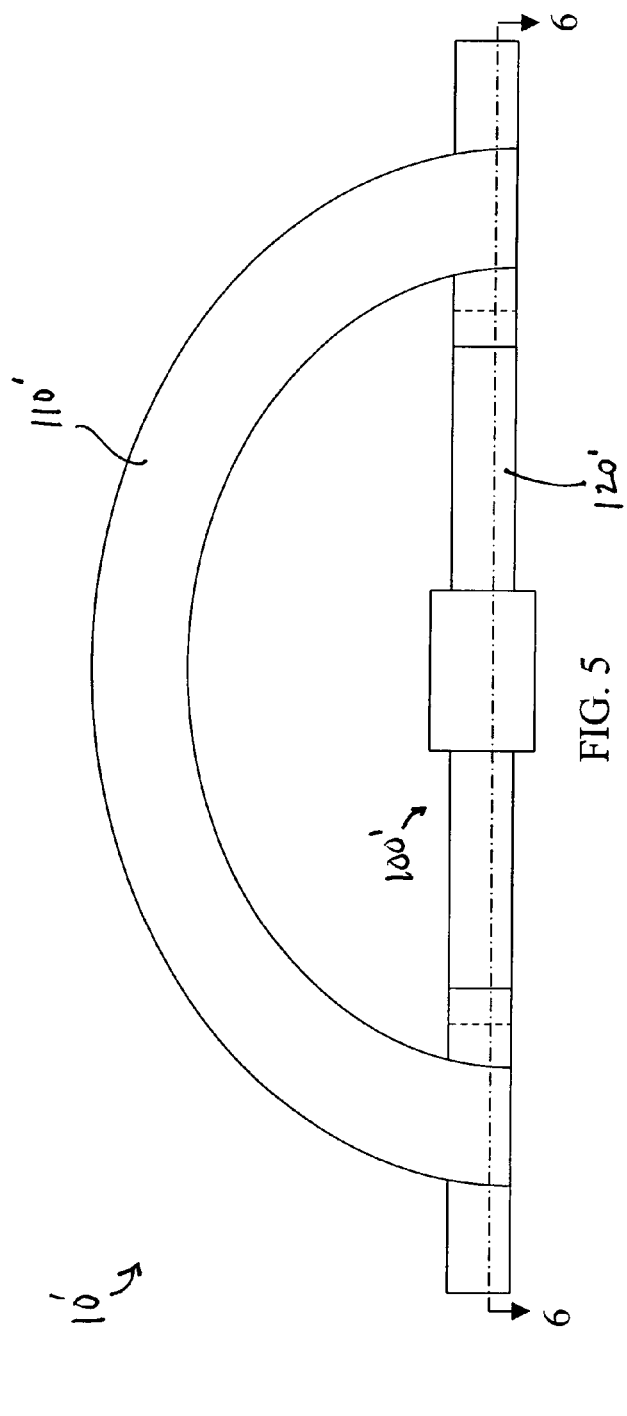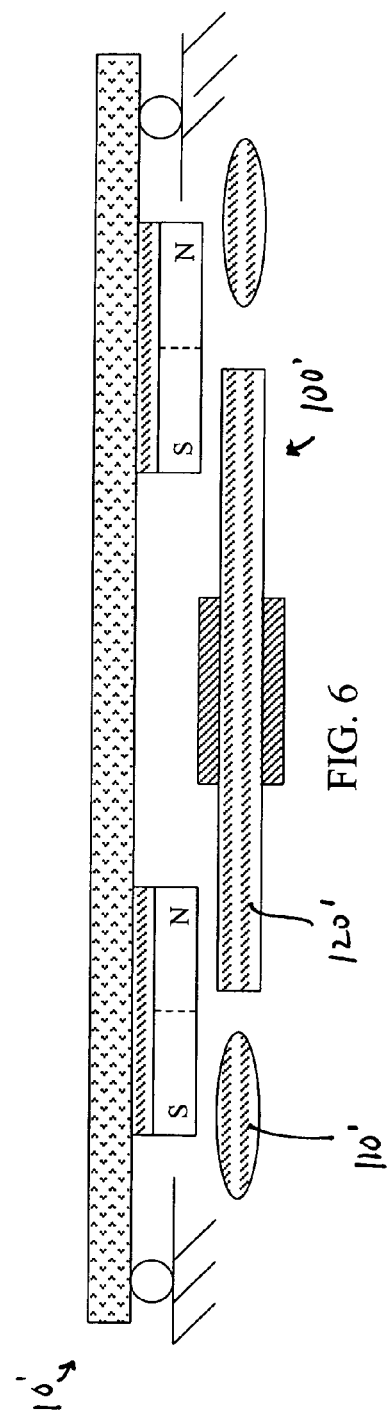

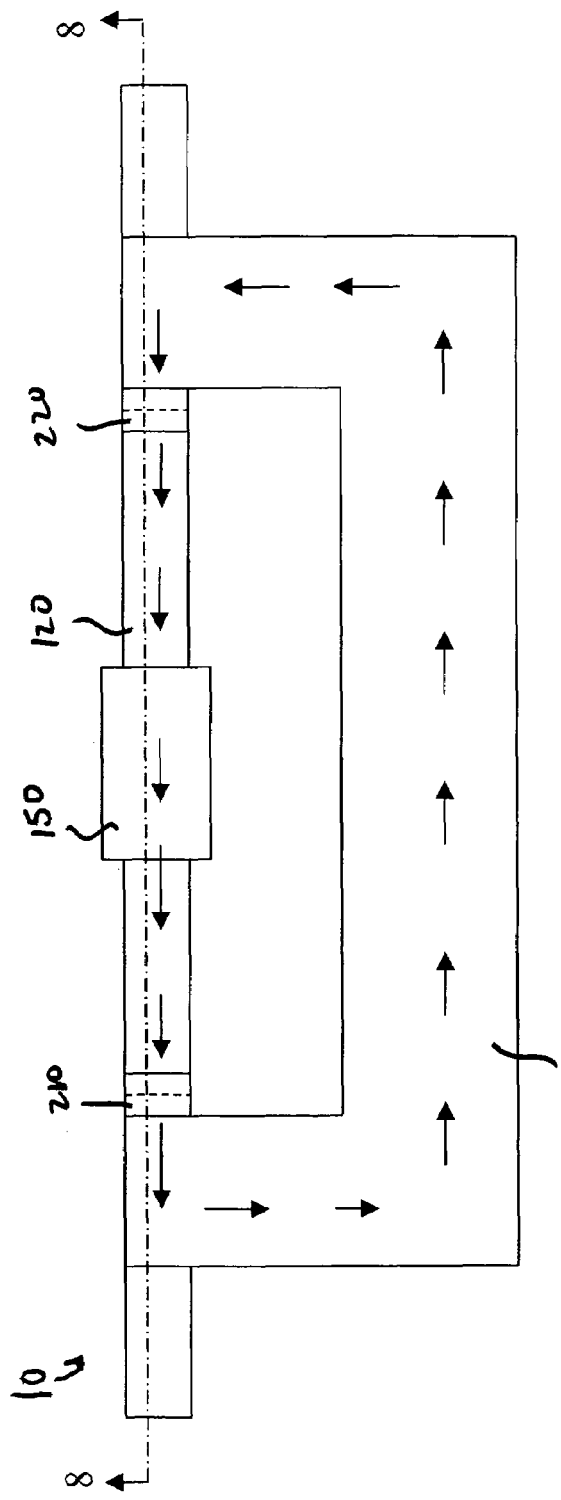
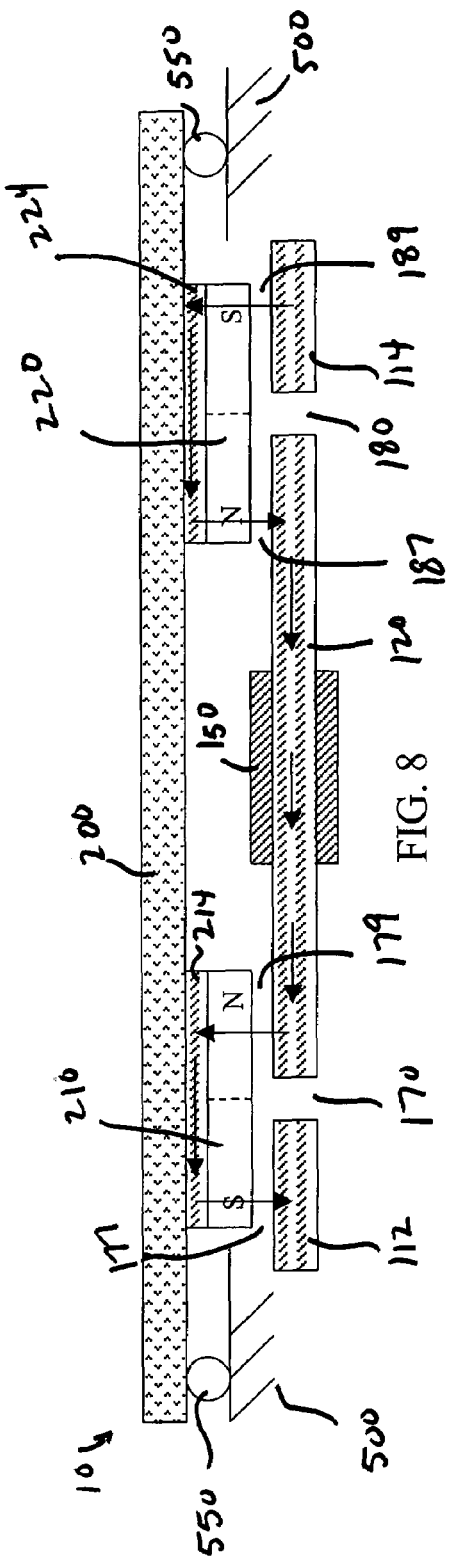
FIG. 7
FIG. 8

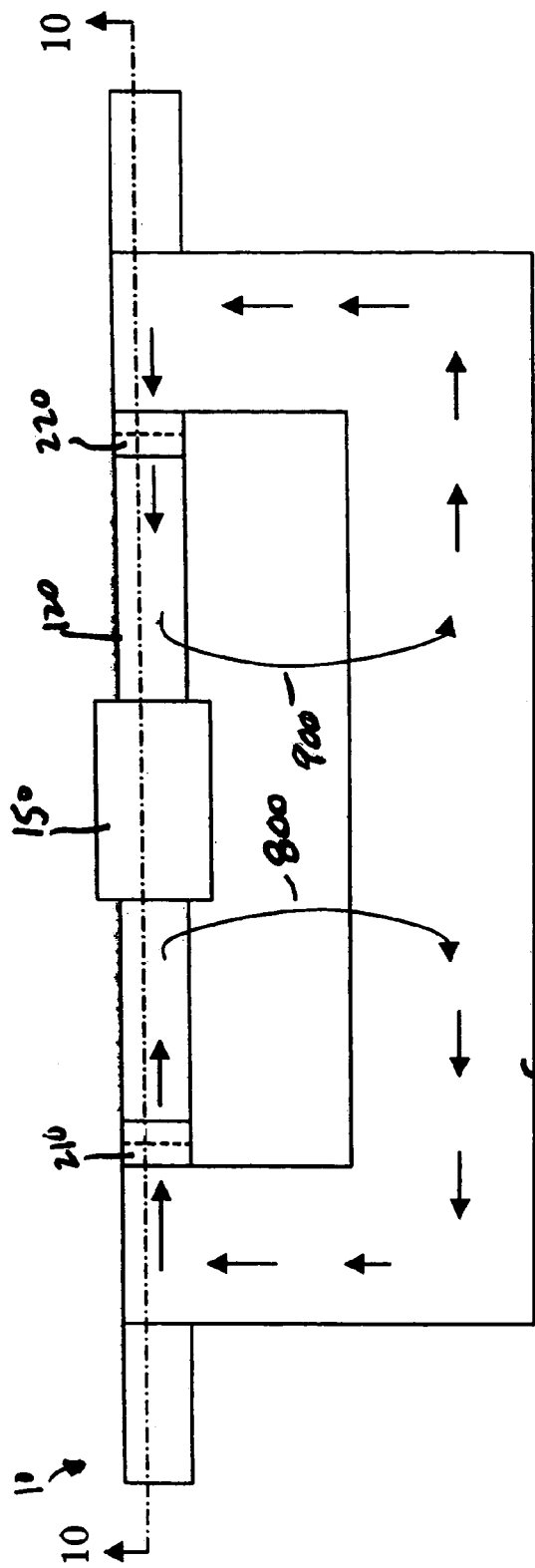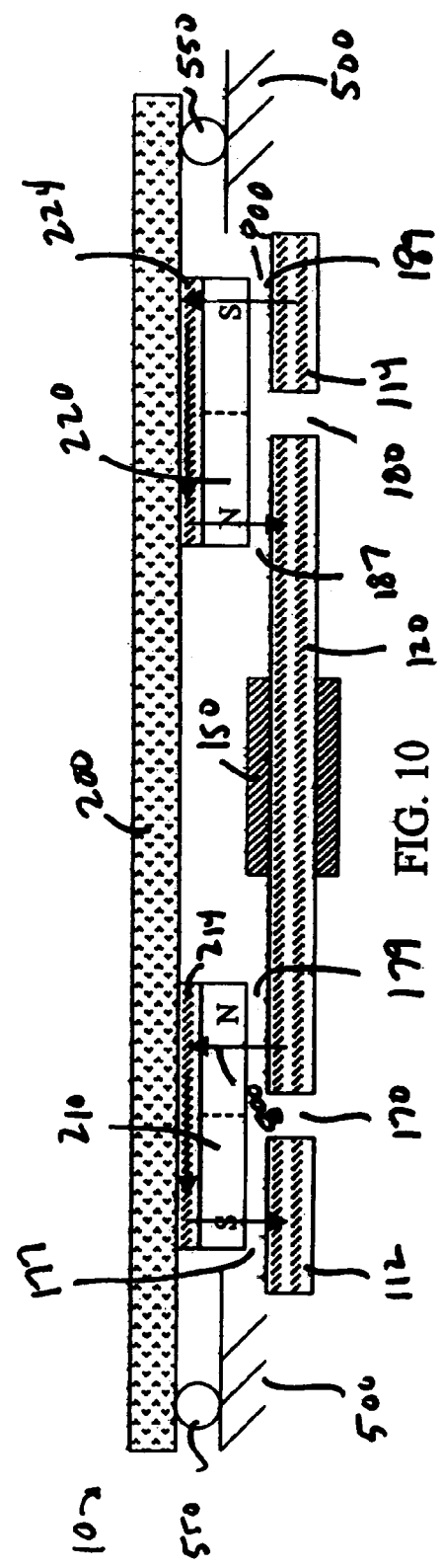
FIG. 9
FIG. 10

MOVING MAGNET ACTUATOR

CROSS-REFERENCE TO RELATED APPLICATION

This application claims the benefit of U.S. Patent Application No. 60/561,917, entitled "Haptic Touch Screens," filed on Apr. 14, 2004, the entirety of which is incorporated herein by reference.

BACKGROUND

The invention relates generally to magnetic actuators for haptic feedback interface devices, and more particularly to magnetic actuators having multiple poles and multiple magnets.

Haptic feedback interface devices are used for a variety of different functions and are often used with a variety of systems. For example, haptic feedback interface devices are used with computer controlled simulations, games, and other application programs. A computer system typically displays a graphical environment to a user on a display screen or other output device. The user can interact with the displayed environment to play a game, experience a simulation or "virtual reality" environment, or otherwise influence events or images depicted on the screen or in an application program or operating system. Such user interaction can be implemented through an interface device, such as a joystick, "joypad" button controller, mouse, trackball, stylus and tablet, foot or hand pedals, control knob, touch panel, etc., that is connected to the computer system. The computer updates the graphical display in response to manipulation of the interface device and provides haptic feedback based on manipulation and/or movement of the object.

The haptic feedback provided by the interface device is often output via magnetic actuators in the interface device. Known magnetic actuators often are too large for the volume constraints in, for example, touch panel applications. Known magnetic actuators are also often not scaleable (i.e., different designs are needed depending upon the particular application).

A need exists for improvements in moving magnet actuators for interface devices to produce desired haptic effects.

SUMMARY OF THE INVENTION

An apparatus is disclosed that includes an electromagnetically conductive assembly including a first member having a first end and a second end, and a second member physically distinct from and disposed between the first end and the second end of the first member. The second member and the first end of the first member define a first gap. The second member and the second end of the first member define a second gap. A movable member moves with respect to the conductive member. A first magnet is coupled to the movable member and is disposed a distance from the first gap. A second magnet is coupled to the movable member and is disposed a distance from the second gap.

In other embodiments, an apparatus includes a first conductive member having a first end and a second end. A second conductive member that is physically distinct from the first conductive member has a first end and a second end. A coil is disposed about the first conductive member. A first magnet is coupled to a moveable member and is disposed a distance from a first gap between the first end of the first conductive member and the first end of the second conductive member. A second magnet is coupled to the moveable member and is disposed a distance from a second gap between the second end of the first conductive member and the second end of the second conductive member. The first conductive member, the second conductive member, the first magnet, the second magnet and the coil collectively define a first operational mode when the coil is activated and a second operational mode when the coil is not activated. The first operational mode defines substantially a single field path. The second operational mode defines substantially a first field path and a second field path different from the first field path.

BRIEF DESCRIPTION OF THE DRAWINGS

FIG. 5 is an bottom plan view of an actuator for an interface device according to a further embodiment of the invention.

FIG. 6 is a cross-sectional view of the actuator illustrated in FIG. 5, taken along line 6-6 in FIG. 5.

FIG. 7 is a bottom view of an actuator according to an embodiment of the invention illustrating a flux path associated with the actuator in a first operational mode.

FIG. 8 is a cross-sectional view of an actuator according to an embodiment of the invention taken along line 8-8 in FIG. 7 and illustrating the flux path associated with the actuator in the first operational mode.

FIG. 9 is a bottom view of an actuator according to an embodiment of the invention illustrating a flux path associated with the actuator in a second operational mode.

FIG. 10 is a cross-sectional view of an actuator according to an embodiment of the invention taken along line 10-10 in FIG. 9 and illustrating the flux path associated with the actuator in the second operational mode.

FIG. 12 is a side view of the actuator illustrated in FIG. 11.

DETAILED DESCRIPTION

Figure 1:
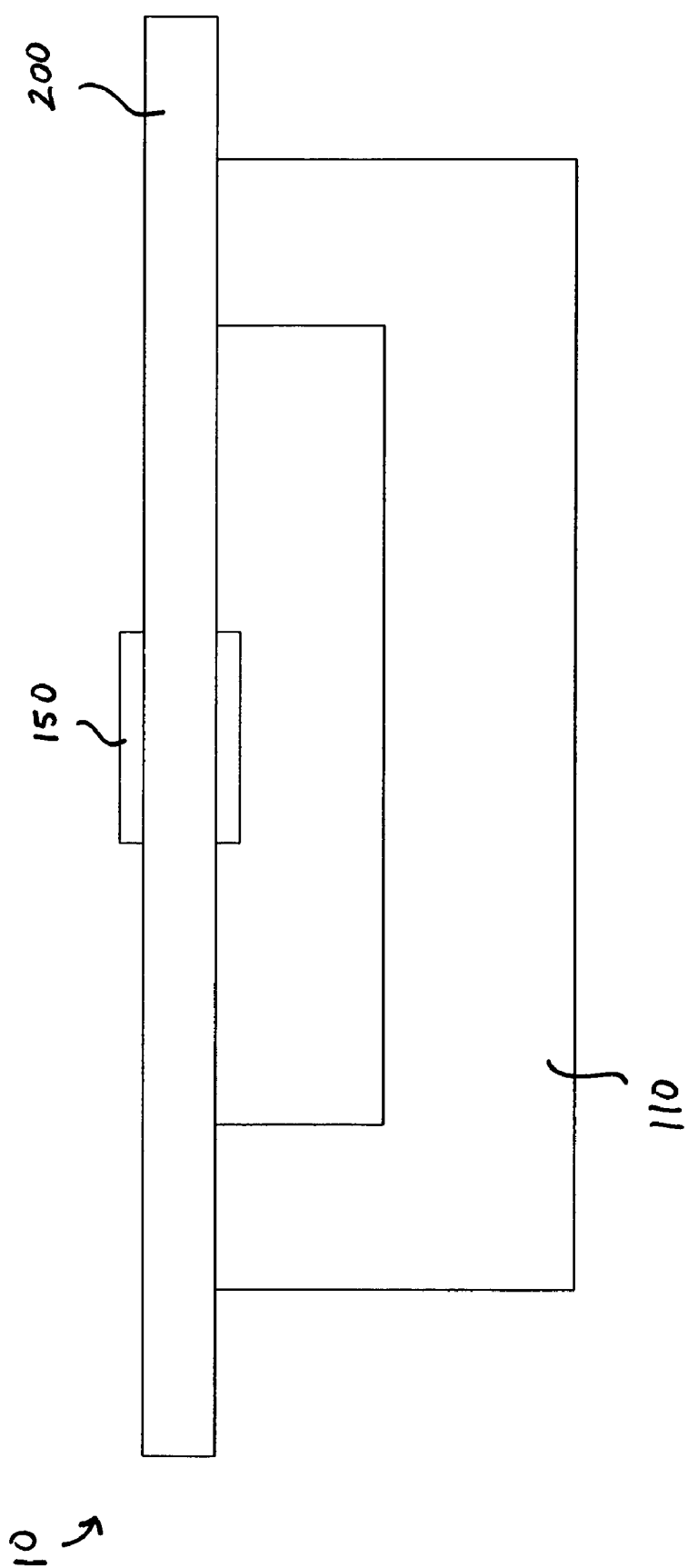
FIG. 1 is a top plan view of an actuator for an interface device according to an embodiment of the invention.
Figure 2:
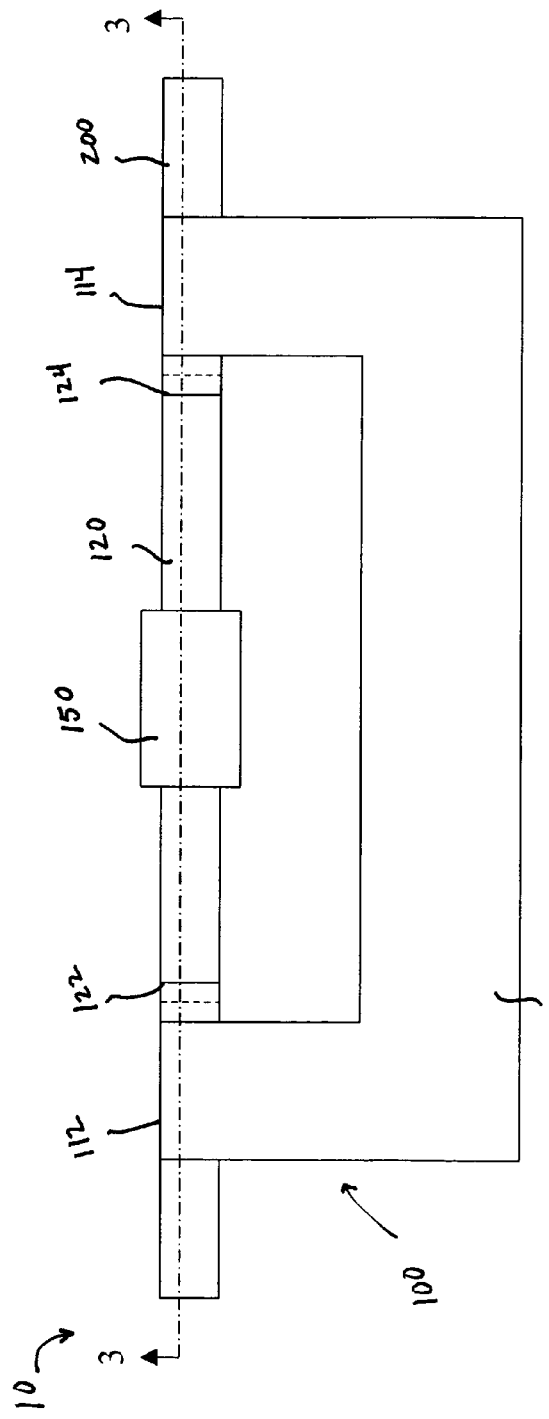
FIG. 2 is bottom plan view of the actuator illustrated in FIG. 1.
Figure 3:
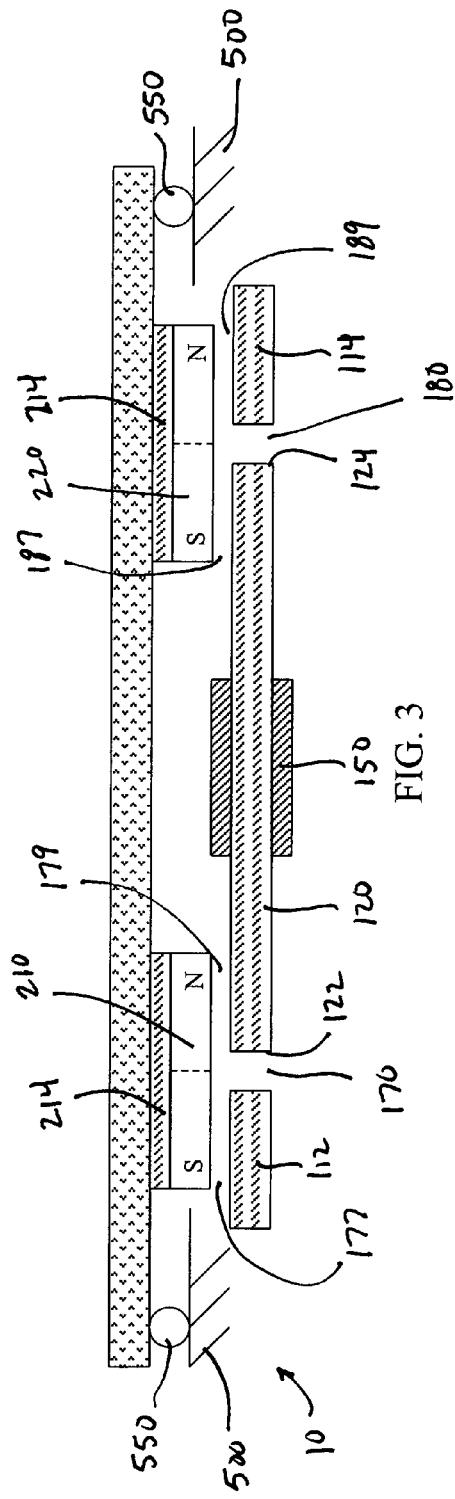
FIG. 3 is a cross-sectional view of the actuator illustrated in FIGS. 1 and 2, taken along line 3-3 in FIG. 2.

Referring to FIGS. 1-4, an actuator 10 for use in an interface device 50 according to an embodiment of the invention is illustrated. The actuator 10 includes an electromagnetically conductive assembly 100 that is substantially planar in configuration. A movable member 200 is coupled opposite the conductive assembly 100 and is configured to move with respect to the conductive assembly 100. The conductive assembly 100 includes a first member 110 having a first end 112 and a second end 114, and a second member 120 having a first end 122 and a second end 124. The second member 120 is disposed between the first end 112 and the second end 114 of the first member 110 as best seen in FIG. 2.

In some embodiments, the first member 110 and the second member 120 are physically distinct from one another. In other words, the first member 110 and the second member 120 are separate pieces that are not joined together. In some embodiments of the invention, the first member 110 and the second member 120 are manufactured as substantially flat pieces of steel. Alternatively, the first member 110 and the second member 120 can be manufactured from different metals.

Both the first member 110 and the second member 120 are substantially fixed in position in a support or housing 500 of the interface device 50 in which they are disposed. The second member 120 is substantially fixed in position with respect to the first member 110. The support 500 in which the conductive assembly 100 is positioned is a rigid substrate such as a Printed Circuit Board (PCB).

A lateral or transverse gap 170 is defined between the first end 112 of the first member 110 and the second end 122 of the second member 120. Another lateral or transverse gap 180 is defined between the second end 114 of the first member 110 and the second end 124 of the second member 120. In some embodiments, the size of the transverse gaps 170, 180 is substantially the same.

A coil 150 is coupled to the conductive assembly 100. In some embodiments of the invention, coil 150 is coupled to the second member 120 of the conductive assembly 100. Alternatively, or in addition, the coil 150 may be coupled to the first member 110 of the conductive assembly 100. In the illustrated embodiment, one coil 150 is positioned in approximately the center of the second member 120 of the conductive assembly.

As discussed above, the movable member 200 is coupled to the interface device 50 opposite conductive assembly 100 and is configured to move with respect to the conductive assembly 100. The movable member 200 is diamagnetic. In an embodiment of the invention, the movable member 200 is made from plastic. In another embodiment of the invention, the movable member 200 is made from aluminum. In some embodiments, the movable member 200 moves parallel to the conductive assembly.

A first magnet 210 and a second magnet 220 are coupled to the movable member 200. In some embodiments, the magnets 210, 220 are coupled to the movable member 200 via a steel element or backing material 214. The first magnet 210 and the second magnet 220 are configured to induce flux loops in the actuator 10 as will be discussed below. The flux loops induced by the magnets 210, 220 provide a flux that can be added to or subtracted from the flux of the coil 150. In other words, the magnets 210, 220 drive the flux through the conductive assembly 100 as will be discussed in greater detail below. The first magnet 210 and the second magnet 220 are coupled to the movable member 200 opposite the transverse gaps 170, 180 respectively (i.e., above the transverse gaps 170, 180 from the perspective shown in FIG. 3). The first magnet 210 is disposed a distance from transverse gap 170 such that a planar gap 177 is defined between a south pole S of the first magnet 210 and the first end 112 of the first member 110 of the conductive assembly 100. A second planar gap 179 is defined between a north pole N of the first magnet 210 and the first end 122 of the second member 120 of the conductive assembly 100. The second magnet 220 is disposed a distance from transverse gap 180 such that a third planar gap 187 is defined between a south pole S of the second magnet 220 and the second end 124 of the second member 120 of the conductive assembly 100. A fourth planar gap 89 is defined between a north pole N of the second magnet 220 and the second end 114 of the first member 110 of the conductive assembly 100.

In the illustrated embodiment, the movable member 200 is spaced from the conductive assembly 100 by a pair of diamagnetic roller bearings 550. The roller bearings are configured to provide the appropriate distance between the conductive assembly 100 and the movable member 200 as well as to provide an ease of movement of the movable member 200. In an embodiment of the invention, the distance between the movable member 200 and the conductive assembly 100 is approximately 0.010 inch.

While the movable member 200 is spaced apart from the conductive assembly 100, the movable member 200 and the conductive assembly 100 are attracted by a magnetic force. In some embodiments, the attractive magnetic force is approximately twenty times greater than the shear force between the roller bearings 550 and the movable member 100. It is the shear force that provides the substantial work output of the actuator 10.

Actuation of the coil 150 (i.e., passing current through the coil) causes a force to be output to the movable member 200, thereby causing the movable member 200 to move. Current is driven in one direction to produce a force in one direction, and is reversed to produce force in the opposite direction. The magnitude of the force output depends upon various factors including, for example, magnet strength, magnet pole area and ampere-turn rating of the coil.

Figure 4:
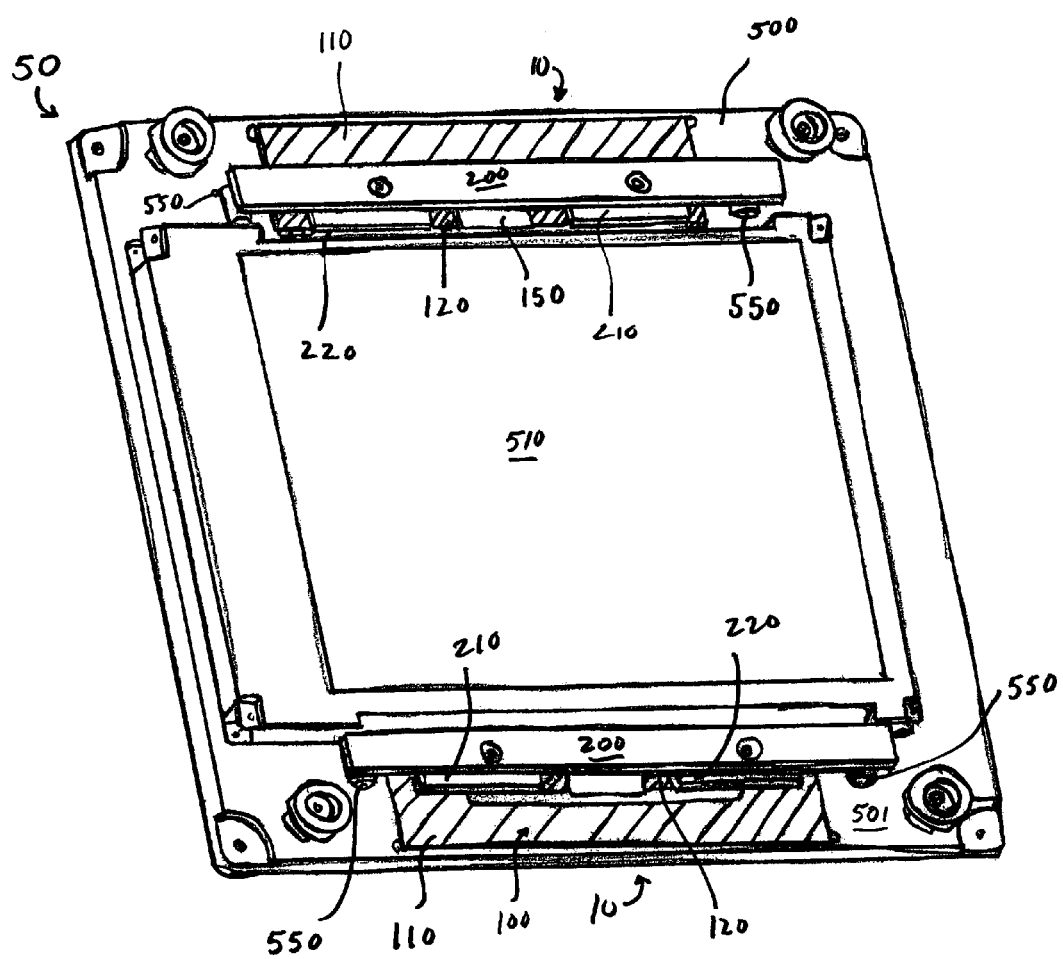
FIG. 4 is a front perspective view of an interface device including actuators according to an embodiment of the invention.

An example of an implementation of the actuator 10 in an interface device 50 (a touch screen in the illustrated embodiment) is best seen in FIG. 4. The interface device 50, a portion of which is illustrated, includes a housing 500 having a top surface 501. In the illustrated embodiment, the conductive assembly 100 is positioned in a cavity (not illustrated) in the housing 500 and is flush with the top surface 501 of the housing 500. The interface device 50 includes a display 510 that is covered by a known cover (not illustrated) such as plastic, polyvinyl chloride, ABS, Polycarbonate, etc. The cover is coupled to the movable member 200 by conventional means. The plastic cover serves as a bridge between the two actuators 10 such that the actuators 10 collectively move the cover to provide haptic feedback to a user of the interface device 50. Although multiple actuators 10 are illustrated, a greater or fewer number of actuators could be used to provide the desired haptic feedback.

In some embodiments of the invention, the first member 110 is substantially "U-shaped" and substantially rectangular in cross-section, and the second member 120 is substantially linear.

Another embodiment of an actuator 10' is illustrated in FIGS. 5 and 6. The actuator 10' includes a conductive assembly 100' having a first member 110' and a second member 120'. The first member 110' is substantially "C-shaped" and is substantially oval in cross-section.

FIGS. 7 and 8 show an actuator according to an embodiment of the invention having a flux path associated with the actuator in a first operational mode. The flux path is represented by the arrows in the figures. Although illustrated as a relatively uniform and thin path, the actual flux path has a three dimensional and non-uniform profile. In the first operational mode, when a current is passed through the coil 150, the first magnet 210, second magnet 220, the steel elements 214 and the movable member 200 are forcefully displaced by the current in the coil 150. A single flux path loop is provided that causes the displacement of the movable member 200.

The flux path is such that the flux travels through the first member 110 of the conductive assembly 100 and across planar gap 189. The flux travels towards the second magnet 220 because magnetic flux travels along the most conductive path (i.e., the path where the flux undergoes the least resistance). Because the air in transverse gap 180 is not the most conductive path, the flux tends to travel toward the second magnet 220. Once across planar gap 189, the flux travels through the south pole of magnet 220 and across the steel element 214. The steel element 214 provides a conductive path for the flux and is able to maintain the flux without significant dissipation or absorption. While the steel element 214 is not necessary for the flux to travel, it provides less resistance than air and hence is a better conductor for the flux. The flux then travels through the north pole of second magnet 220 and across planar gap 187. The flux travels across the second member 120 of the conductive assembly 100 and across planar gap 179, then up through the north pole of magnet 210. For the reasons discussed above, the flux then continues across the steel element 214 associated with the magnet 210 and down through the south pole of first magnet 210. The flux ultimately travels across planar gap 177 and into the first member 110 of the conductive assembly 100.

When there is no current in the coil, a second operational state, or equilibrium state of the actuator 10 is achieved. Referring to FIGS. 9 and 10, an actuator 10 according to an embodiment of the invention and a flux path loop associated with the actuator 10 in the second operational mode is illustrated. When in the second operational mode, two opposing magnetic path loops are defined. The first path loop 800 is in a different direction from the second path loop 900. Because the field paths are opposing one another, the movable member 200 is maintained approximately in the center of the actuator 10, rather than being attracted to one side or the other. The first field path 800 travels from the second member 120 of the conductive assembly 100 and across planar gap 179 and through the north pole of first magnet 210. For the reasons discussed above, the flux then continues across the steel element 214 associated with the first magnet 210 and through the south pole of first magnet 210. The flux then travels across planar gap 177 and into the first member 110 of the conductive assembly.

The second field path 900 travels from the first member 110 of the conductive assembly 100, and across planar gap 189. Once across planar gap 189, the flux travels through the south pole of the second magnet 220 and across the steel element 214 associated with the second magnet 220. The flux then travels along the length of steel element 214 and through the north pole of second magnet 220 and across planar gap 187. The flux travels into the second member 120 of the conductive assembly 100.

In the un-powered state (i.e., the second operational state), assuming that the first member 110 is sufficiently far from the coil 150 so as to minimize the magnitude of the two flux loops (i.e., flux leakage), then the resulting circuit operates as a function of the first magnet 210 and the second magnet 220 repelling each other through the second member 120. This arrangement allows for the centering effect when the assembly 100 is in the second operational state. Thus, the first member 110 is not a significant contributor to the resulting circuit when the assembly is in the second operational state.

The first member 110 is a significant contributor to the resulting circuit when the assembly is in the first operational state. In the first operational state, a single flux loop is superimposed on the static repulsive field of the first magnet 210 and the second magnet 220. A much larger difference in flux can exist with the first member 110 in position. Without the first member 110, when in the first operational state, the repulsion/attraction would still occur from the coil 150, but at a lower force level.

The actuator 10 can be actuated based on a number of different conditions. For example, the actuator 10 can be used to provide haptic feedback in the form of a soft button, a feedback based on interaction with a particular graphical element, etc. The output of the actuator 10 is, for example, based on a signal associated with a movement or a position of the interface device 50.

Sensors (not illustrated) can sense position and/or movement of the device cover in x, y and/or z directions. In some embodiments of the invention, a microcontroller includes a processor having a processor readable medium. The processor is configured to receive signals from the sensor and output signals to the actuator 10. The processor can be, for example, a commercially available personal computer, or a less complex computing or processing device that is dedicated to performing one or more specific tasks. For example, the processor can be dedicated to providing an interactive virtual reality environment with which an interface device can interact.

The processor, according to one or more embodiments of the invention, can be a commercially available microprocessor or combination of microprocessors. Alternatively, the processor can be an application-specific integrated circuit (ASIC) or a combination of ASICs, which are designed to achieve one or more specific functions, or enable one or more specific devices or applications. In yet another embodiment, the processor can be an analog or digital circuit, or a combination of multiple circuits.

In some embodiments, the processor includes or is coupled to the processor readable medium. The processor readable medium can include, for example, one or more types of memory. For example, the processor readable medium can include a read only memory (ROM) component and a random access memory (RAM) component. The processor readable medium can also include other types of memory that are suitable for storing data in a form retrievable by the processor. For example, electronically programmable read only memory (EPROM), erasable electronically programmable read only memory (EEPROM), flash memory, as well as other suitable forms of memory can be included within the processor readable medium. The processor can also include a variety of other components, such as for example, co-processors, graphics processors, etc., depending upon the desired functionality of the interface device 50.

The processor can store data in the processor readable medium or retrieve data previously stored in the processor readable medium. The components of the processor can communicate with devices external to the processor by way of an input/output (I/O) component (not shown). According to some embodiments of the invention, the I/O component can include a variety of suitable communication interfaces. For example, the I/O component can include, for example, wired connections, such as standard serial ports, parallel ports, universal serial bus (USB) ports, S-video ports, local area network (LAN) ports, small computer system interface (SCSI) ports, and so forth. Additionally, the I/O component can include, for example, wireless connections, such as infrared ports, optical ports, Bluetooth® wireless ports, wireless LAN ports, or the like.

Figure 11:
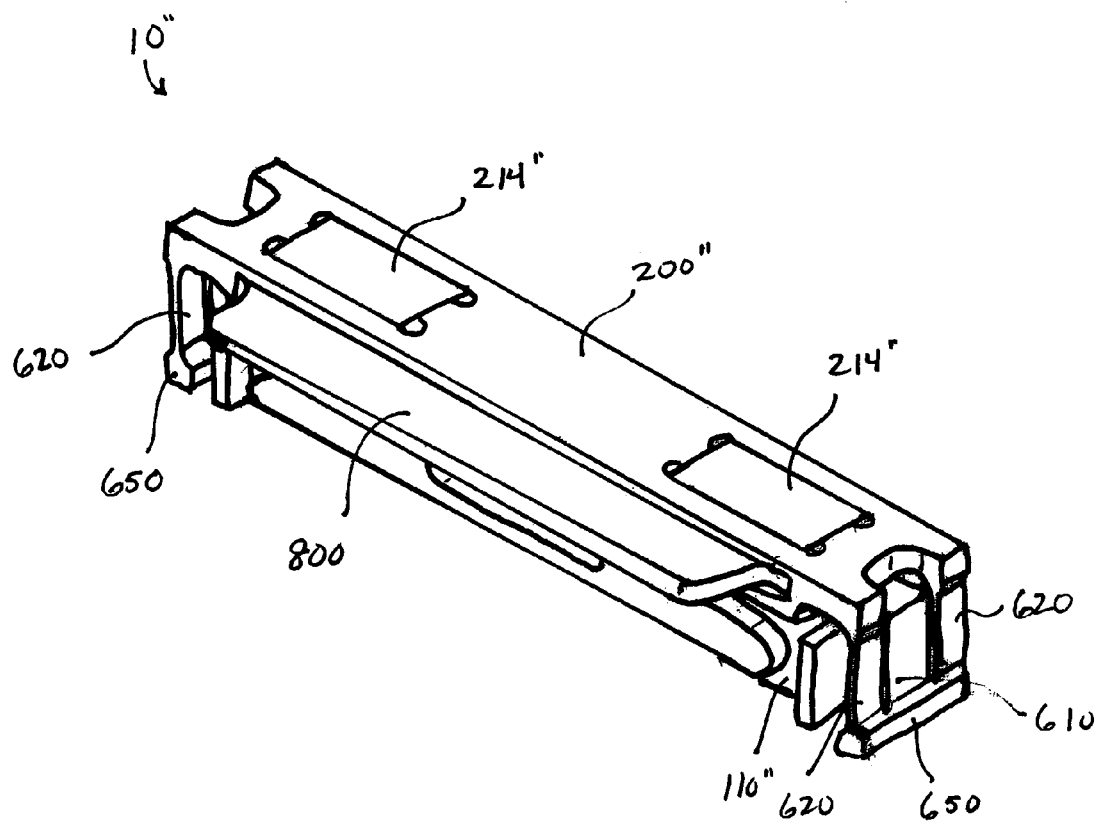
FIG. 11 is a perspective view of an actuator according to a further embodiment of the invention.
Figure 13:
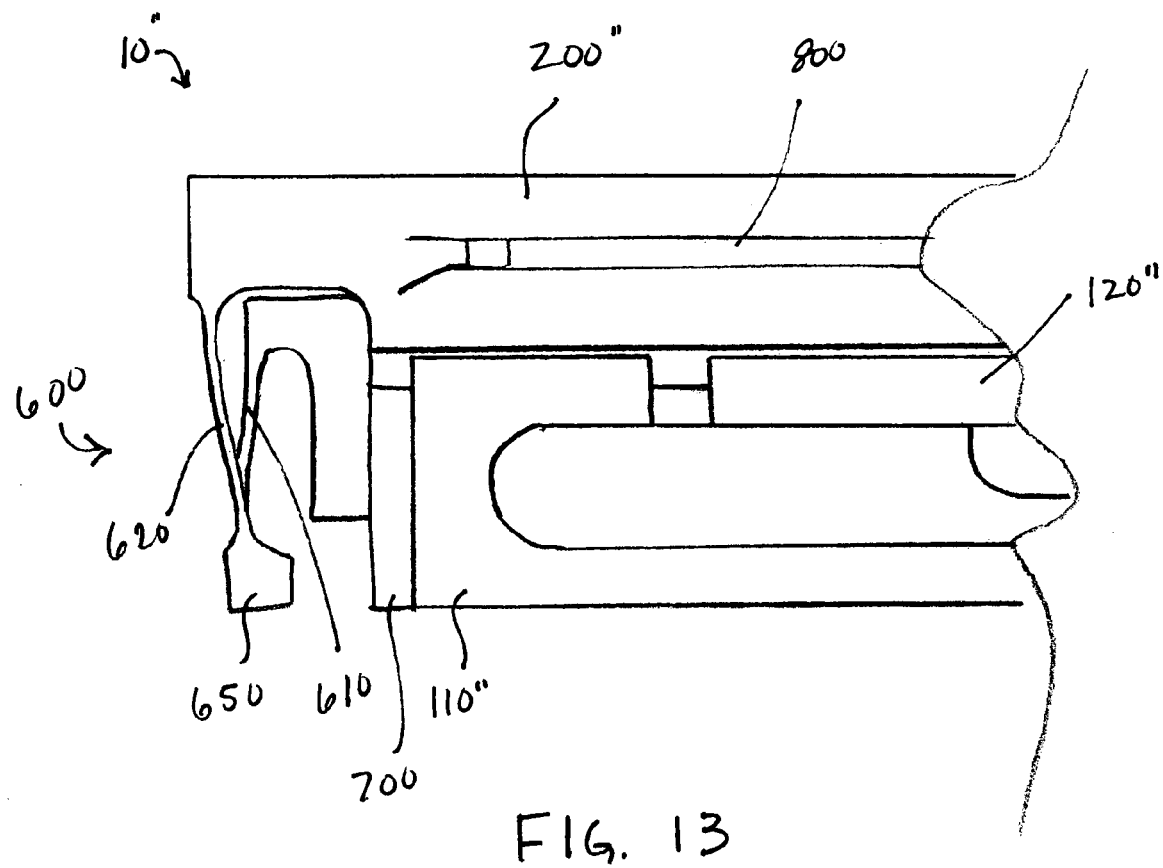
FIG. 13 is a detailed view of a portion of the actuator illustrated in FIGS. 11 and 12.

An alternative embodiment of an actuator for use with an interface device according to another embodiment of the invention is illustrated in FIGS. 11-13. The actuator 10" includes an electromagnetically conductive assembly 100" including a first member 110" having a first end 112" and a second end 114", and a second member 120" having a first end 122" and a second end 124". The second member 120"

is disposed between the first end 112" and the second end 114" of the first member 110" as best seen in FIG. 12.

In some embodiments, the first member 110" and the second member 120" are physically distinct from one another. In other words, the first member 110" and the second member 120" are separate pieces that are not joined together. In some embodiments of the invention, the first member 110" and the second member 120" are manufactured as substantially flat pieces of steel. Alternatively, the first member 110" and the second member 120" can be manufactured from different metals.

Both the first member 110" and the second member 120" are substantially fixed in position in a support or housing (not shown) of the interface device. The second member 120" is substantially fixed in position with respect to the first member 110". The support 500" in which the conductive assembly 100" is positioned is, for example, a plastic housing.

A lateral or transverse gap 170" is defined between the first end 112" of the first member 110" and the second end 122" of the second member 120". Another lateral or transverse gap 180" is defined between the second end 114" of the first member 110" and the second end 124" of the second member 120". In some embodiments, the size of the transverse gaps 170", 180" is substantially the same.

A coil 150" is coupled to the conductive assembly 100". In some embodiments of the invention, coil 150" is coupled to the second member 120" of the conductive assembly 100". Alternatively, or in addition, the coil 150" may be coupled to the first member 110" of the conductive assembly 100". In the illustrated embodiment, one coil 150" is positioned in approximately the center of the second member 120" of the conductive assembly.

A movable member 200" is coupled to the interface device substantially opposite conductive assembly 100" and is configured to move with respect to the conductive assembly 100". The movable member 200" is diamagnetic. In an embodiment of the invention, the movable member 200" is made from plastic. In another embodiment of the invention, the movable member 200" is made from aluminum. In some embodiments, the movable member 200" moves parallel to the conductive assembly.

A first magnet and a second magnet (not visible) are coupled to the movable member 200". In some embodiments, the magnets are coupled to the movable member 200" via a steel element or backing material 214". The first magnet and the second magnet are configured to induce flux loops in the actuator 10" as discussed above. The flux loops induced by the magnets provide a flux that can be added to or subtracted from the flux of the coil 150" as discussed in detail above. The first magnet and the second magnet are coupled to the movable member 200" opposite the transverse gaps 170", 180" respectively. The first magnet is disposed a distance from transverse gap 170 such that a planar gap is defined between a south pole S of the first magnet and the first end 112" of the first member 110" of the conductive assembly 100". A second planar gap is defined between a north pole N of the first magnet and the first end 122" of the second member 120" of the conductive assembly 100". The second magnet is disposed a distance from transverse gap 180" such that a third planar gap is defined between a south pole S of the second magnet and the second end 124" of the second member 120" of the conductive assembly 100". A fourth planar gap is defined between a north pole N of the second magnet and the second end 114" of the first member 110" of the conductive assembly 100".

In the illustrated embodiment, the movable member 200" is spaced from the conductive assembly 100" as a function of the length of two flexure members or resilient members 600 disposed at opposite ends of the movable member 200". The resilient members 600 are configured to provide the appropriate distance between the conductive assembly 100" and the movable member 200" as well as to provide for the movement of the movable member 200". While the movable member 200" is spaced apart from the conductive assembly 100", the movable member 200" and the conductive assembly 100" are attracted by a magnetic force as discussed above.

Actuation of the coil 150" (i.e., passing current through the coil) causes a force to be output to the movable member 200", thereby causing the movable member 200" to move. Current is driven in one direction to produce a force in one direction, and is reversed to produce force in the opposite direction. The magnitude of the force output depends upon various factors including, for example, magnet strength, magnet pole area, ampere-turn rating of the coil and the compliance of the resilient members 600.

In some embodiments the resilient members 600 have an identical structure. For ease of reference, only one resilient member will be described in detail. The resilient members 600 each include an interior flexure beam 610 and two exterior flexure beams 620. The flexure beams 610, 620 are coupled to a mount 650 that is coupled to the housing 500" of the interface device in which the actuator 10" is disposed. Alternatively, each of the flexure beams 610, 620 can be coupled to a separate mount or coupled directly to the housing. The interior flexure beam 610 is coupled to the first member 110" via a coupling member 700 as best seen in FIG. 13. Exterior flexure beams 620 are coupled to the movable member 200" and are configured to flex as the movable member 200" reciprocates during operation.

In some embodiments, the exterior flexure beams 620 are integrally formed with the movable member 200". Alternatively, the exterior flexure beams 620 are removably coupled to the movable member 200". As a result of this configuration, the interior flexure beam 610 is in tension and the exterior flexure beams 620 are in compression.

While the configuration of the actuator 10" is different from the embodiments described above, the flux path and operational modes of the actuator 10" is substantially similar. FIGS. 11 and 12, illustrate the actuator 10" in the second mode of operation as described above. FIG. 13 illustrates the actuator 10" during the first mode of operation with the movable member 200" moved to one side (to the left side with reference to FIG. 13). In this position, the exterior flexure members 620 are moved in the direction of travel of the movable member 200". The interior flexure beam 610 serves as a stop to limit the travel of the movable member 200". The distance of travel of the movable member 200" can be increased or decreased, for example, by varying the width of coupling member 700 and/or the dimensions of the movable member 200".

The actuator 10" is configured to support, for example, a touch panel or touch screen (not illustrated). In some embodiments, a support flange 800 is coupled to the movable member 200" to support the touch panel or touch screen. When the actuator 10" is actuated, the movable member 200" moves as described above and imparts a corresponding movement to the touch panel to which it is coupled.

The configuration of the actuator 10" provides support for the high attractive forces by using the resilient members 600. In some embodiments, a single molded plastic part may be injected around the assembly of steel 110", 120", coil 150", and magnets. When molded, the movable member 200" and the conductive assembly 100" are capable of being displaced relative to each other by way of the resilient members 600. The resilient members 600 support the loads imparted from the actuator as well as any compression forces from the magnets and user inputs on the touch panel.

In some embodiments, the interior flexure beams 610 are in tension instead of compression. The exterior flexure beams 620 are very stiff to avoid buckling under very high loads, such that the interior flexure beams 610 bear substantially all of the load in tension.

In some embodiments, the resilient members can exhibit resonant behavior at several frequencies related to the operation of actuator 10". The behavior of actuator 10" and the resilient members 600 can be controlled such that a lower magnitude of energy input is required at or near the resonant frequency. Alternatively, high accelerations and magnitudes can be output for a given input energy.

As with the embodiments described above, either a single actuator 10" or multiple actuators 10" can be used in a given device to achieve the desired output effects.

CONCLUSION

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

The previous description of the embodiments is provided to enable any person skilled in the art to make or use the invention. While the invention has been particularly shown and described with reference to embodiments thereof, it will be understood by those skilled in art that various changes in form and details may be made therein without departing from the spirit and scope of the invention.

For example, although the first member 110 and the second member 120 of the electromagnetically conductive assembly 100 are illustrated as being substantially coplanar in some embodiments of the invention, in alternative embodiments, the first member 110 and second member 120 need not be coplanar.

Although in some embodiments of the invention the second member 120 of the electromagnetically conductive assembly 100 is illustrated and described as being a monolithic member, the second member 120 may include multiple separate members positioned between the ends of the first member 110 of the conductive assembly 100.

Although the actuator 10 is illustrated and described as having a single coil 150 in some embodiments of the invention, in alternative embodiments the actuator 10 can include multiple coils 150 positioned on either the first member 110 and/or the second member 120 of the conductive assembly 100.

Although the first magnet 210 and the second magnet 220 are each described as being a single magnet in some embodiments of the invention, in alternative embodiments there are pairs of magnets coupled to the movable member. In other words, in such alternative embodiments, there are two poles on the top of the magnet and two poles on the bottom of the magnet.

Although the actuator 10 is described as being implemented in a touch screen in some embodiments of the invention, the actuator can be coupled to any interface device to provide haptic feedback. Moreover, the actuator 10 of the invention can be used in combination with other similar or different actuators in a single interface device.

Although actuators 10 are illustrated as being separate in some embodiments of the invention. Two actuators can be coupled together.

Although the actuator 10 is generally described above without reference to specific dimensions, in some embodiments of the invention, the first member 110 of the conductive assembly is approximately 100 mm long. The central transverse portion of the U-shaped member is 6 mm wide. The second member 120 of the conductive assembly is 57 mm long and 12 mm wide. The transverse gaps 170, 180 are 7 mm wide. The first magnet 210 and the second magnet 220 are each 30 mm long and 13 mm wide. The distance between the center of the first magnet 210 to the center of the second magnet 220 is 67 mm. Each steel element 214, 224 is 32 mm long and 13 mm wide. The planar gaps 177, 179, 187, 189 are between approximately 0.4 mm and 0.8 mm. The coil 150 is 22 mm long. The distance between the coil 150 and first member 110 of the conductive assembly 100 is 4 mm. In other embodiments, other dimensions are possible.

Although actuators 10 described above were disclosed as being separate components, the two actuators can be coupled together via a single chassis. For example, the first member 110 of two separate actuators can be coupled together.

Although the resilient members 600 are described above as having identical structures, in alternative embodiments the resilient members 600 need not be identical.

Although the embodiments described above were described separately for ease of reference, components of the various embodiments could be interchangeable. Moreover, different actuators described above can be used in the same device.

What is claimed is:

1. An apparatus, comprising:
   an electromagnetically conductive assembly including a first member having a first end and a second end,
   a second member physically distinct from and disposed between the first end and the second end of the first member, the second member and the first end of the first member defining a first gap, the second member and the second end of the first member defining a second gap;
   a movable member configured to move with respect to a conductive member;
   a first magnet coupled to the movable member and disposed a distance from the first gap; and
   a second magnet coupled to the movable member and disposed a distance from the second gap.

2. The apparatus of claim 1, wherein the second member is substantially fixed relative to the first member.

3. The apparatus of claim 1, wherein the second member and the first member are coplanar.

4. The apparatus of claim 1, wherein the movable member is configured to move parallel to the conductive assembly.

5. The apparatus of claim 1, wherein the conductive assembly is disposed in a support, the support further including a bearing assembly configured to support the movable member.

6. The apparatus of claim 1, further comprising a resilient member coupled between the movable member and a support in which the conductive assembly is disposed.

7. The apparatus of claim 1, wherein the first magnet and the second magnet are configured to provide an attractive force between the movable member and the conductive assembly.

8. The apparatus of claim 1, wherein a third gap is defined between the first magnet and the conductive assembly.

9. The apparatus of claim 1, wherein a third gap is defined between the second magnet and the conductive assembly.

10. The apparatus of claim 1, wherein a third gap is defined between the first magnet and the conductive assembly and a fourth gap is defined between the second magnet and the conductive assembly, the first magnet and the second magnet being configured to provide a flux through the third gap and the fourth gap.

11. The apparatus of claim 1, further comprising a coil coupled to the conductive assembly.

12. The apparatus of claim 1, further comprising a plurality of coils coupled to the conductive assembly.

13. The apparatus of claim 1, wherein the movable member is diamagnetic.

14. The apparatus of claim 1, wherein the first magnet and the second magnet collectively are configured to provide a single flux path when a coil disposed about one of the first member and the second member is activated.

15. An apparatus, comprising:
a conductive metal member having a first portion and a second portion, the second portion being coplanar with and physically distinct from the first portion;
a magnet disposed a distance from the first portion and the second portion of the conductive member by a gap; and
a diamagnetic movable member mechanically coupled to the magnet and configured to move with respect to the conductive member; and
a resilient member coupled between the movable member and a housing in which the conductive member is fixedly coupled.

16. The apparatus of claim 15, wherein a gap is defined between the magnet and the conductive member.

17. The apparatus of claim 15, wherein the magnet is configured to provide an attractive force between the movable member and the conductive member.

18. The apparatus of claim 15, further comprising a coil coupled to the second portion of the conductive member, the coil configured to provide a current to the conductive member.

19. The apparatus of claim 15, wherein the conductive member substantially contains a flux provided by the magnet and a coil.

20. The apparatus of claim 15, wherein the conductive member is fixedly coupled to a housing, the housing including a roller bearing configured to support the movable member.

21. The apparatus of claim 15, wherein a flux associated with the magnet travels substantially in a single path.

22. The apparatus of claim 15, the magnet being a first magnet, the gap being a first gap, the apparatus further comprising a second magnet disposed a distance from a second gap defined between the first portion and the second portion.

23. The apparatus of claim 15, wherein the movable member is configured to be coupled to an interface device.

24. An apparatus, comprising:
a first conductive member having a first end and a second end;
a second conductive member physically distinct from the first conductive member, the second conductive member having a first end and a second end;
a coil disposed about the first conductive member;
a first magnet coupled to a moveable member and disposed a distance from a first gap between the first end of the first conductive member and the first end of the second conductive member; and
a second magnet coupled to the moveable member and disposed a distance from a second gap between the second end of the first conductive member and the second end of the second conductive member, the first conductive member, the second conductive member, the first magnet, the second magnet and the coil collectively defining a first operational mode when the coil is activated and a second operational mode when the coil is not activated, the first operational mode defining substantially a single field path, the second operational mode defining substantially a first field path and a second field path different from the first field path.

* * * * *